United States Patent [19]
Klimo

[11] 4,027,214
[45] May 31, 1977

[54] FIELD SHUNTING CIRCUIT

[75] Inventor: Robert G. Klimo, Parma, Ohio

[73] Assignee: Cleveland Machine Controls, Inc., Cleveland, Ohio

[22] Filed: Oct. 28, 1975

[21] Appl. No.: 626,673

[52] U.S. Cl. .............................. 318/139; 318/251
[51] Int. Cl.² ......................................... H02P 5/16
[58] Field of Search .......... 318/139, 251, 332, 139, 318/527–529; 317/13, 16

[56] References Cited
UNITED STATES PATENTS

| | | | |
|---|---|---|---|
| 3,384,799 | 5/1968 | Thiele | 318/251 |
| 3,500,161 | 3/1970 | Domann et al. | 318/139 |
| 3,656,638 | 4/1972 | Ries et al. | 318/139 |
| 3,983,462 | 9/1976 | Jones | 318/139 |

*Primary Examiner*—David Smith, Jr.

*Attorney, Agent, or Firm*—Phillips, Moore, Weissenberger, Lempio & Majestic

[57] ABSTRACT

A circuit for automatically shunting the field winding of a direct current motor and reapplying full field thereto. A low-level pull-in comparator compares a signal proportional to armature current to a low-level reference potential and causes the field to be shunted when the armature current signal falls below the low-level reference potential. A high-level drop-out comparator compares a signal proportional to armature current to a second independent high-level reference potential and causes the full field to be applied when the armature current signal is greater than the high-level reference potential. Prior to actuation, the pull-in comparator disables the drop-out comparator. Upon actuation, the pull-in comparator latches itself in actuated state and enables the drop-out comparator to be actuated. Upon actuation the drop-out comparator unlatches the pull-in comparator.

10 Claims, 1 Drawing Figure

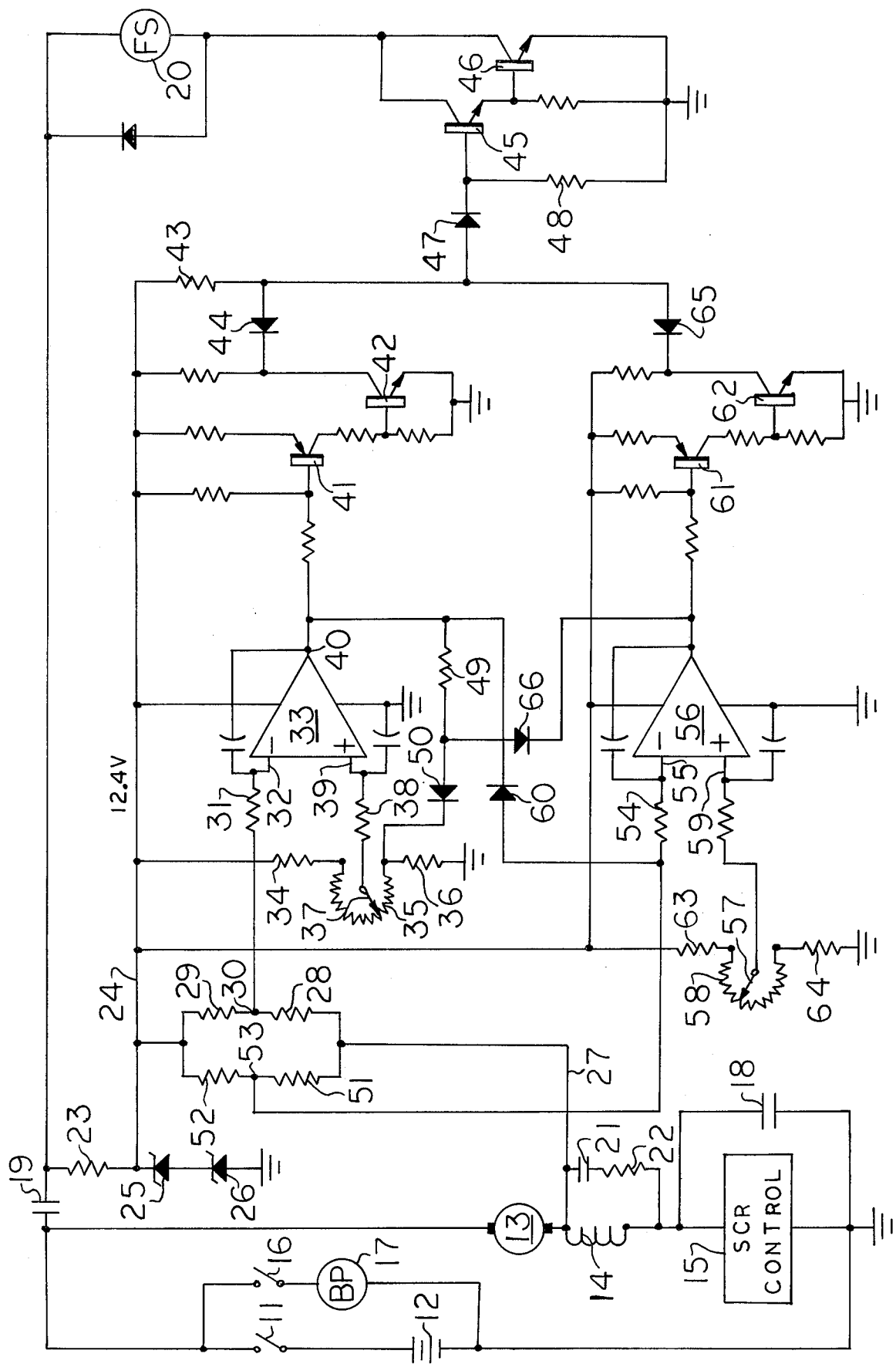

FIELD SHUNTING CIRCUIT

BACKGROUND OF THE INVENTION

This invention relates to the control of an electric motor having an armature and field winding powered from a source of direct current.

Various control systems have been devised for direct-current motors, such as are used for propulsion purposes in lift trucks or other vehicles, to vary the current to the motor. Typically, these systems utilize a silicon controlled rectifier (SCR) control circuit which regulates the voltage applied to the motor. When it is desired to apply full power to the motor the SCR control circuit is bypassed so that the motor is connected directly across the battery and full battery potential is applied to the motor.

When operating in the bypass mode with constant full battery potential applied to the motor and with full armature current going through the field winding, a series-connected direct-current motor will have a maximum speed dependent upon the torque required to propel the vehicle in the direction the motor is propelling the vehicle. It is desirable under low torque requirements to provide field shunting whereby a portion of the armature current is shunted around the field winding so that the field strength is weakened. Since the motor speed is inversely proportional to the field strength, field shunting will provide additional speed over full-field speed.

The field shunting control should also be sensitive to the torque requirement so that if the motor is operating in a weakened field mode and the torque requirements increase (as when the vehicle goes up a slope) full field will again be applied so that the motor will deliver maximum torque.

SUMMARY OF THE INVENTION

The present invention provides a field shunting control sensitive to torque requirements which: will automatically shunt the field winding when the armature current (proportional to the square root of the torque) decreases to a predetermined low level; which will allow the motor to operate in field shunted mode even though the armature current rises above the predetermined low level; and, which will reapply full field when the armature current rises to a predetermined higher level.

The points at which the field is shunted and full field reapplied are independently adjustable and do not interact.

BRIEF DESCRIPTION OF THE DRAWING

The single FIGURE is a schematic diagram of a field shunt control circuit embodying the present invention.

DESCRIPTION OF THE PREFERRED EMBODIMENT

Referring now to the drawing, the field shunting circuit of the present invention is shown in connection with a propulsion system as may be used in a lift-truck.

The system is energized by closure of main switch 11 which connects a source of direct current, e.g., battery 12, to the series-connected armature 13 and field winding 14 of the motor through a silicon controlled rectifier control 15. The control 15 preferably has a main silicon controlled rectifier (SCR) which is repeatedly turned on and off to supply current pulses to the motor. The ratio of the on-time to the off-time of the main controlled rectifier is adjusted by the operator, usually by way of a foot pedal-operated potentiometer (not shown), so that the effective power delivered to the motor may be varied as desired.

In the event the operator wishes to apply full battery potential to the motor, switch 16 is closed to energize the bypass coil 17. Typically, switch 16 will be actuated by depressing the accelerator foot-pedal full way. The main bypass contacts 18 will close to bypass the SCR control 15 and the auxiliary bypass contacts 19 will close to supply power to the field shunting control to be described below.

In general, the field shunting circuit compares the voltage drop across the series field 14 of the motor with a predetermined reference voltage. When the voltage across the field is less than the reference voltage, field shunt coil 20 is energized so that its contacts 21 will close to connect field shunt resistor 22 across the field 14. Since the voltage across the series field is proportional to the armature current, field shunting will thus occur when the motor load current decreases to a desired value.

When the load current increases such that the shunted field voltage exceeds a higher reference voltage, the field shunt coil 20 is de-energized to take the field shunt resistor 22 out of the circuit and again apply full field to the motor.

Closing of the auxiliary bypass contactor 19 develops a current flow through resistor 23 to develop a +12.4-volt potential on bus 24 which is shunt-regulated by the series connection of zener diodes 25 and 26.

The field winding 14 is connected by line 27 to the series-connected voltage-dividing resistors 28 and 29. Current will flow through resistors 28 and 29 in an amount dependent upon the difference in potential between the regulated 12.4 volts and the potential across the field winding. If the resistors 28 and 29 are of equal value, the potential at junction 30 is halfway between the field potential and 12.4 volts. An increase in motor current and field voltage will cause the potential at junction 30 to go up proportionately. Similarly, a decrease in motor current will cause the potential at junction 30 to go down proportionately.

Junction 30 is connected by resistor 31 to the inverting input 32 of "pull-in" transistor amplifier 33 connected as a differential-input bistable comparator. Such a device is commonly available commercially and has a pair of inputs, one termed "inverting" and the other termed "non-inverting". When the voltage applied to the inverting terminal is less positive than that applied to the non-inverting terminal, the output voltage of the amplifier is at a high level. When the voltage applied to the inverting terminal becomes greater than that appearing at the non-inverting terminal, the output of the amplifier changes to a low level. Thus, the voltage level of the amplifier output indicates the relative values of the voltage differences appearing at the input terminals thereof.

A second voltage divider, comprised of resistor 34, variable resistor 35 (pull-in adjustment) and resistor 36, is connected to the 12.4 v. bus 24. The wiper arm 37 of potentiometer 35 is connected by resistor 38 to the non-inverting input 39 of comparator 33. The wiper arm 37 is set such that the voltage at the arm is equal to the voltage at junction 30 when the field voltage is at a value at which field shunting is to occur.

If the voltage at junction 30 is higher than the predetermined level at 37, the comparator 33 is in a stable condition with a low voltage level at output 40. This low level output turns on transistor 41 which conducts and turns on transistor 42, to ground the lower end of resistor 43 through diode 44 and transistor 42, thus preventing the Darlington-connected transistors 45 and 46 from conducting and energizing the field shunt coil 20.

When the armature current decreases, due to decreased load, the voltage at junction 30 decreases. If the voltage decreases at junction 30 to slightly lower than the voltage at point 37, comparator 33 goes to its other bistable condition with a high-level output, which shuts off transistors 41 and 42. When this occurs, resistor 43 is no longer grounded, and current can flow therethrough and through diode 47 and resistor 48 to turn on the Darlington-connected transistors 45 and 46. This completes the energizing, or "pull-in", path for the field shunt coil 20, and the field shunt contacts 21 close to connect the field shunt resistor 22 across the field. Thus, the Darlington pair 45 and 46 act as a switch to energize and de-energize the field shunt relay 20 when the pair is conducting ("closed") or non-conducting ("open"), respectively.

The high-level output of comparator 33 is fed back through resistor 49 and diode 50 to the junction of resistor 36 and potentiometer 35. Thus, when the output of comparator 33 goes high, the voltage at wiper arm 37 and at the non-inverting input of comparator 33 will abruptly increase. At the same time the voltage at junction 30 will decrease due to the reduction of the field voltage caused by the shunting action of the field shunt resistor. Both of these regenerative actions will cause the comparator 33 to latch up with a high-level output.

The drop-out circuit is generally similar to the pull-in circuit described above. The field winding voltage is also applied to voltage-dividing resistors 51 and 52 so that the voltage at junction 53 will vary in accordance with the field winding voltage (and the armature current). The voltage at junction 53 is applied through resistor 54 to the inverting input 55 of the "drop-out" comparator 56. A reference voltage, higher than that used for the pull-in comparator 33, is taken from wiper arm 57 of variable resistor 58 (drop-out adjustment) and applied to the non-inverting input 59 of comparator 56.

As described above, when the field winding voltage is sufficiently high, the pull-in comparator 33 will have a low-level output. This low-level output is coupled through diode 60 to the inverting input of the drop-out comparator 56 so that the potential at the inverting input will be less than the potential on the non-inverting input even though otherwise it would be higher. Thus, when pull-in comparator 33 has a low-level output, it will latch the drop-out comparator 56 with a high output. The high output of comparator 56 will keep transistors 61 and 62 from conducting.

When the pull-in circuit operates to energize the field shunt coil 20, the output of the pull-in comparator 33 goes high. Diode 60 becomes reverse-biased and the potential at junction 53 then becomes the same as at junction 30 (assuming resistors 28, 29, 51 and 52 are all equal in value). The wiper arm 57 of variable resistor 58, connected between voltage-dividing resistors 63 and 64, is set to provide a reference level higher than that normally at the wiper arm 37 of variable resistor 35 and thus the output of the drop-out comparator 56 will remain high so that transistors 61 and 62 will remain non-conducting. As the motor current increases, the voltage at junction 53 will increase. When the voltage at the inverting input 55 of the drop-out comparator 56 exceeds the reference voltage at the non-inverting input 59, the output of comparator 56 will go low. This in turn causes transistor 61 to conduct to turn transistor 62 on. The lower end of resistor 43 is now grounded through diode 65 and transistor 62, and the Darlington-connected transistors 45 and 46 are turned off. The field shunt coil 20 becomes de-energized, the field shunt contacts 21 open, and the shunt resistor 22 is removed from across the field winding.

At the same time, when the output of the drop-out comparator 56 goes low, the positive feedback from the pull-in comparator 33 (which latches its non-inverting input 39 high) is removed by diverting the feedback current to a low potential through diode 66. The pull-in comparator 33 will then go to its stable condition with a low-level output. The low-level output of comparator 33 again is applied to the inverting input of the drop-out comparator 56 so that it is restored to its normal condition having a high-level output. Both comparators are then ready to recycle if the armature current decreases again to the level wherein field shunting is to occur.

As may be seen, the pull-in and drop-out points are independently adjustable by variable resistors 35 and 58, and these points do not interact. If the voltage drop across the field winding drops to the level determined by the setting of variable resistor 35, the field shunt resistor will be connected across the field and will remain so connected until the field winding voltage increases to the level established by the setting of variable resistor 58.

What is claimed is:

1. In a field shunting circuit for a d.c. motor having an armature and a field winding connected to a direct current source, and a field shunt resistor, the improvement comprising:
   a. first and second voltage comparators each having first and second inputs and an output which is high when the first input is lower than the second input and is low when the first input is higher than the second input,
   b. means for applying reference voltages to the second inputs of both of said comparators, the reference voltage to said first comparator being lower than that to said second comparator,
   c. means for applying signal voltages proportional to the armature current to the first input of both of said comparators,
   d. means for connecting said field shunt resistor across said field winding when, and only when, the outputs of both comparators are high,
   e. a feedback loop for applying a high output of said first comparator to the second input of said first comparator,
   f. means for applying a low output of said first comparator to the first input of said second comparator,
   g. means for disabling said feedback loop of said first comparator when the output of said second comparator is low.

2. A circuit as set forth in claim 1, wherein each of said comparators is a transistor amplifier connected as a differential-input bistable comparator and wherein the first and second inputs are the inverting and non-inverting terminals thereof respectively.

3. A circuit as set forth in claim 1 wherein said means (b) includes independent voltage dividers for each reference voltage.

4. A circuit as set forth in claim 1 wherein said means (c) includes voltage divider means connected between the field winding and a regulated direct current voltage source.

5. In a field shunting circuit for a direct current motor having an armature winding and a field winding connected to a direct current source, and a field shunt resistor, the improvement comprising:
   a. means including a switch for connecting said field shunt resistor across said field winding when said switch is closed and for disconnecting said field shunt resistor when said switch is open,
   b. a first comparator means having first and second voltage inputs, said first comparator means having first and second stable conditions when the voltage at said first input is higher or lower respectively than the voltage at said second input,
   c. a second comparator means having first and second voltage inputs, said second comparator means having first and second stable conditions when the voltage at said first input is lower or higher respectively than the voltage at said second input,
   d. means for applying a signal voltage, proportional to the current through said armature winding, to the first input of each of said first and second comparator means,
   e. means for applying a first reference voltage to the second input of said first comparator means,
   f. means for applying a second reference voltage to the second input of said second comparator means, said second reference voltage being higher than and independent of said first reference voltage,
   g. means responsive to the first condition of said first comparator means for maintaining said second comparator means in its first stable condition,
   h. means responsive to the second condition of said first comparator means for closing said switch,
   i. means responsive to the change of said first comparator means from its first to its second stable condition for maintaining said first comparator means in its second stable condition even though said signal voltage thereafter becomes higher than said first reference voltage,
   j. means responsive to the second condition of said second comparator means for opening said switch,
   k. means responsive to the second condition of said second comparator means for interrupting the maintenance of said second stable condition of said first comparator means and for allowing said first comparator means to return to its first stable condition.

6. A circuit as set forth in claim 5 wherein:
said means (g) applies a low-level voltage to the first input of said second comparator means,
said means (i) applies a high-level voltage to the second input of said first comparator means, and
said means (k) interrupts the application of high-level voltage to the second input of said first comparator means.

7. A circuit as set forth in claim 5 wherein:
said first comparator means has a low-level voltage output when in its first stable condition and a high-level voltage output when in its second stable condition,
said means (g) applies said low-level voltage output to the first input of said second comparator means,
said means (i) feeds back said high-level voltage output to the second input of said first comparator, and
said means (k) interrupts the feedback of said high-level voltage output to the second input of said first comparator.

8. A circuit as set forth in claim 7 wherein:
said second comparator means has a high-level voltage output when in its first stable condition and a low-level voltage output when in its second stable condition, and
said means (k) applies said low-level voltage output of said second comparator means to the second input of said first comparator means to interrupt said feedback of high-level voltage thereto.

9. A circuit as set forth in claim 5 wherein each of said comparator means (b) and (c) is a transistor amplifier connected as a differential-input bistable comparator and wherein the first input of each is the inverting input and the second input of each is the non-inverting input.

10. A circuit as set forth in claim 5 wherein said means (d) includes voltage divider means connected between the field winding and a regulated direct-current voltage source.

* * * * *

UNITED STATES PATENT OFFICE
CERTIFICATE OF CORRECTION

Patent No. 4,027,214            Dated May 31, 1977

Inventor(s) Robert G. Klimo

It is certified that error appears in the above-identified patent and that said Letters Patent are hereby corrected as shown below:

On the title page, after "Assignee:" - "Cleveland Machine

Controls, Inc., Cleveland, Ohio" should read

--Towmotor Corporation, Mentor, Ohio--.

Signed and Sealed this

Sixth Day of June 1978

[SEAL]

*Attest:*

RUTH C. MASON
*Attesting Officer*

DONALD W. BANNER
*Commissioner of Patents and Trademarks*